(No Model.) 6 Sheets—Sheet 3.
G. LANDMANN.
MACHINE FOR MAKING SCREWS.
No. 407,537. Patented July 23, 1889.
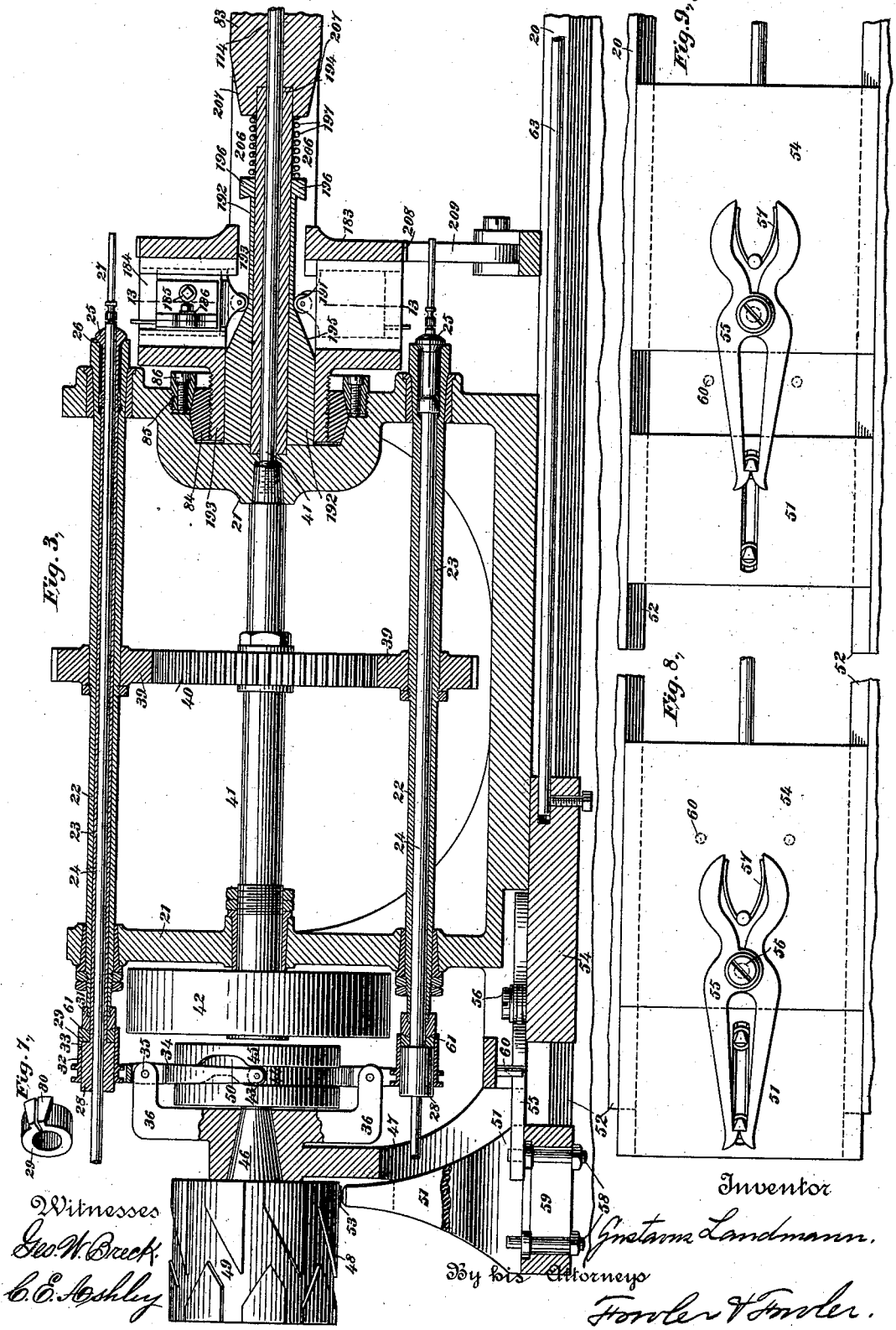
Witnesses
Geo. W. Breck
C. E. Ashley
Inventor
Gustave Landmann
By his Attorneys
Fowler & Fowler (No Model.) 6 Sheets—Sheet 4.
G. LANDMANN.
MACHINE FOR MAKING SCREWS.
No. 407,537. Patented July 23, 1889.
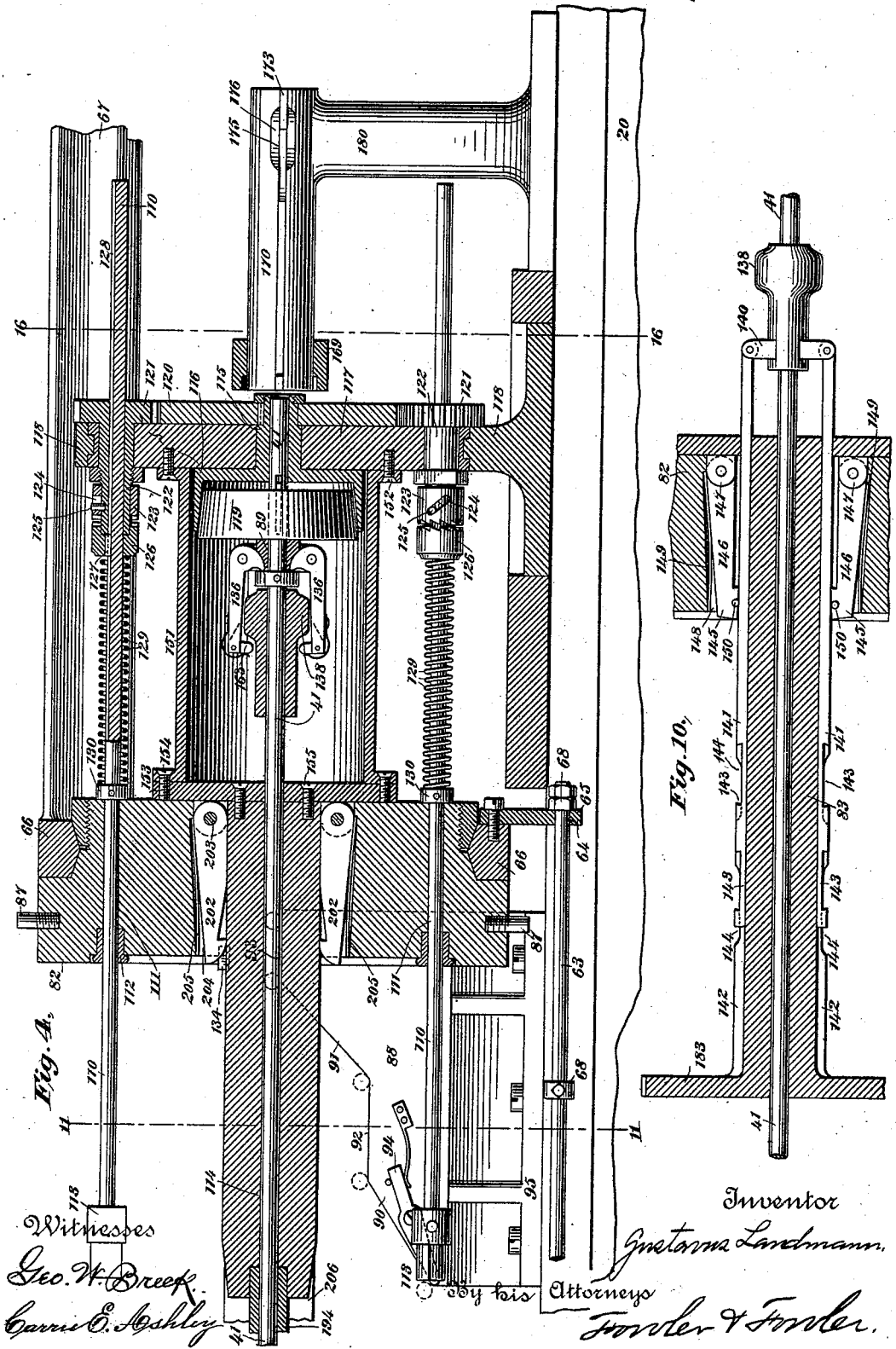

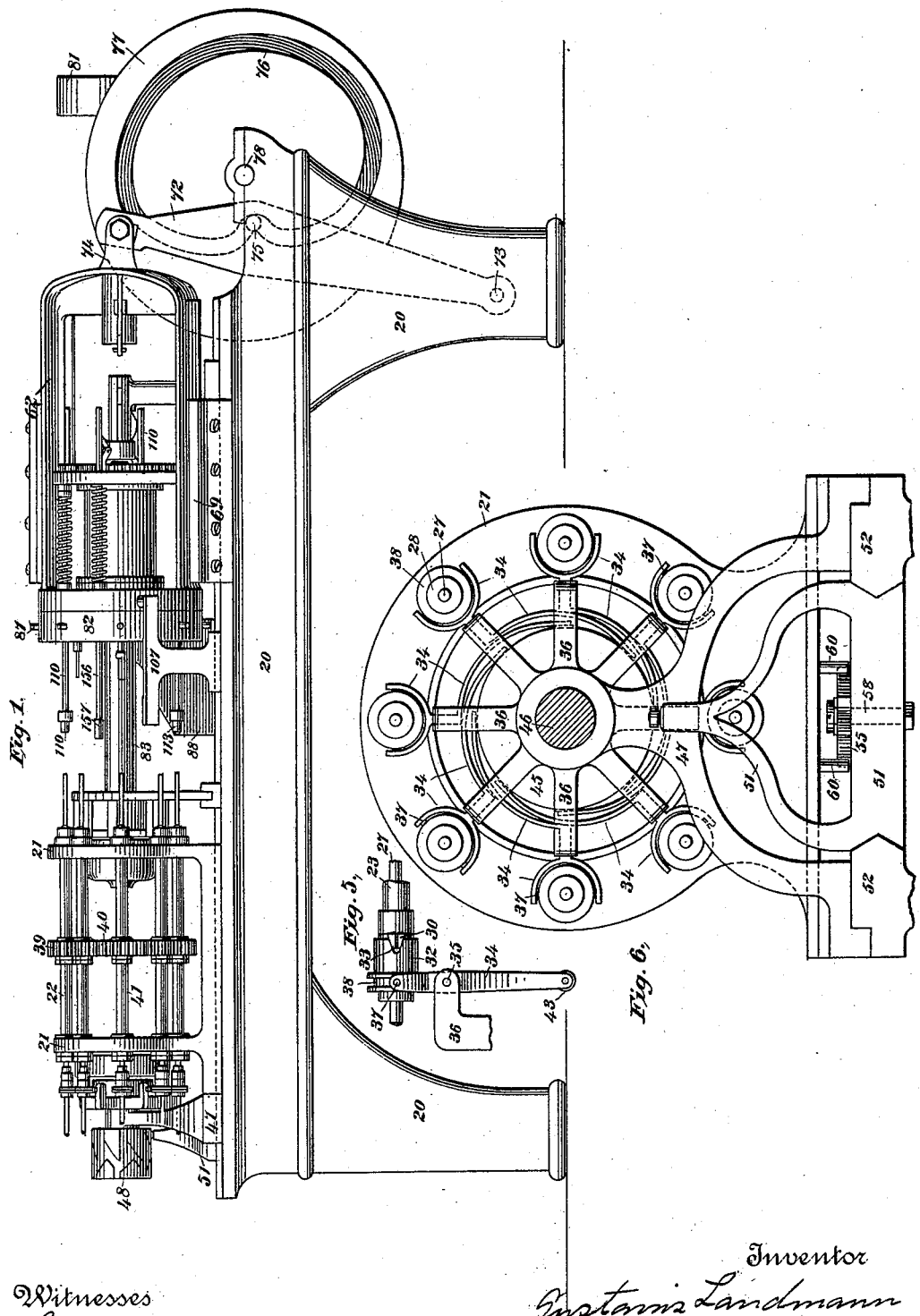

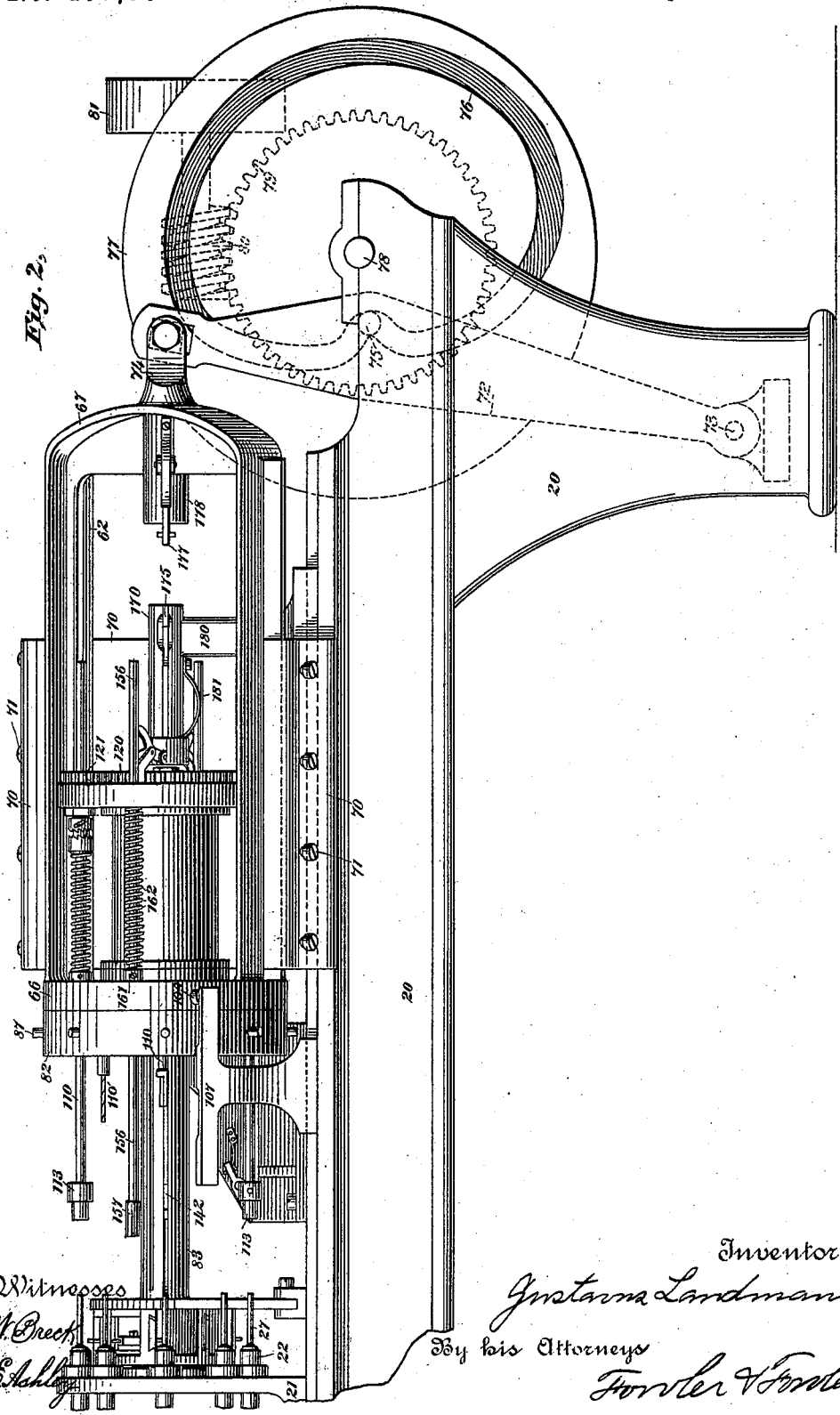

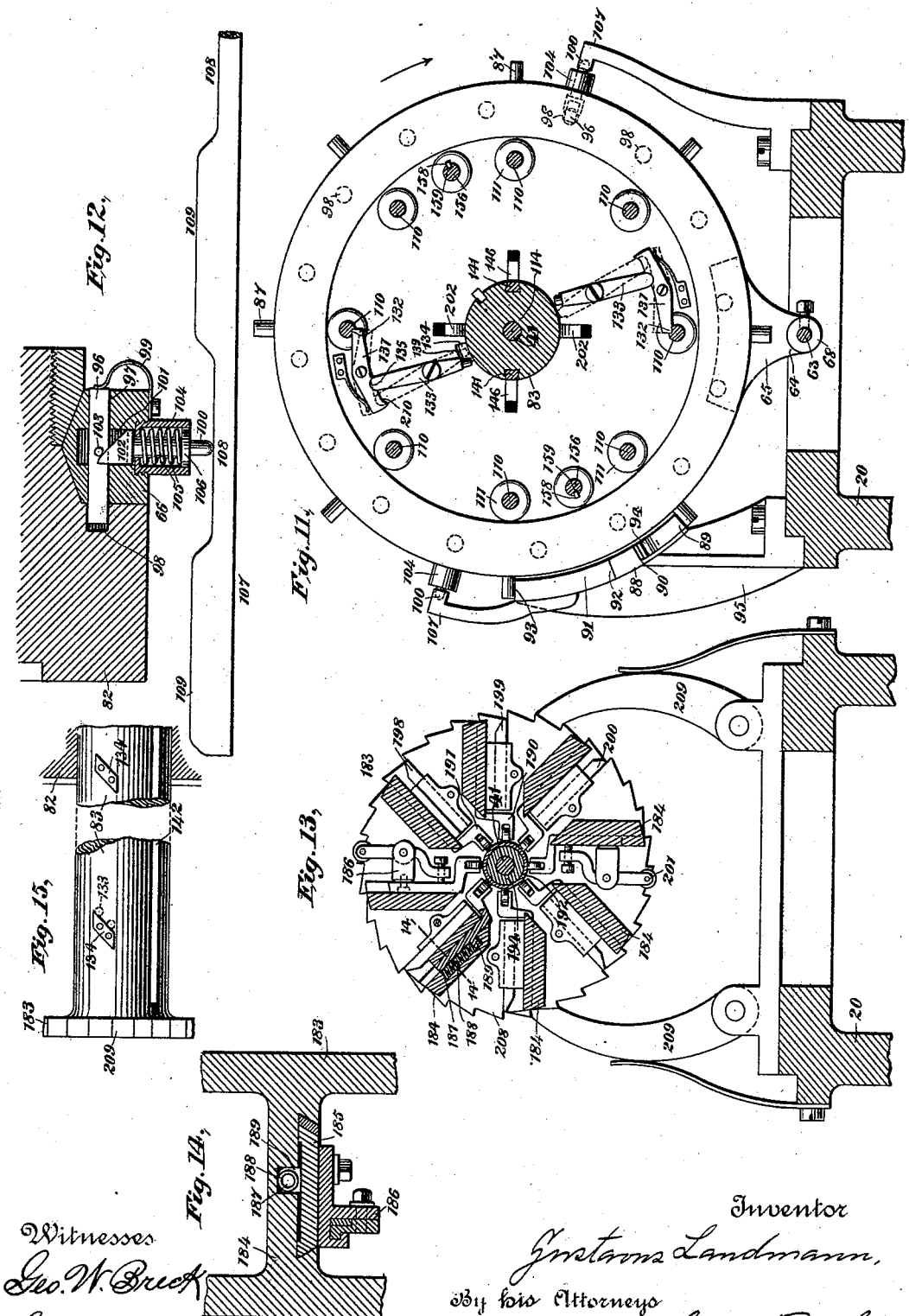

(No Model.) 6 Sheets—Sheet 6.
G. LANDMANN.
MACHINE FOR MAKING SCREWS.
No. 407,537. Patented July 23, 1889.
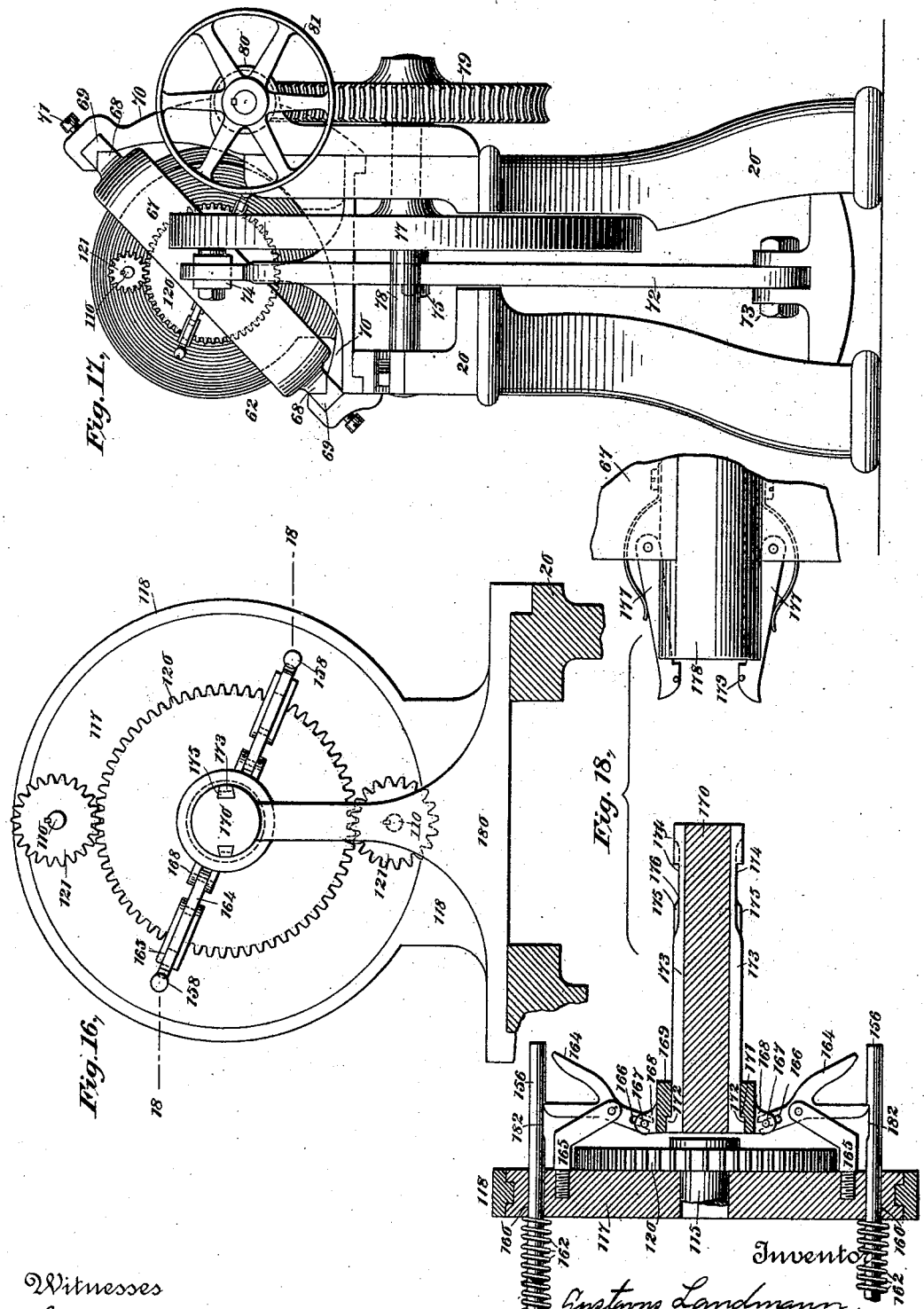
Witnesses
Geo. W. Breck.
Carrie E. Ashley
Inventor
Gustave Landmann,
By his Attorneys
Fowler & Fowler.

UNITED STATES PATENT OFFICE.

GUSTAVUS LANDMANN, OF HARTFORD, CONNECTICUT.

MACHINE FOR MAKING SCREWS.

SPECIFICATION forming part of Letters Patent No. 407,537, dated July 23, 1889.

Application filed August 14, 1888. Serial No. 282,728. (No model.)

*To all whom it may concern:*

Be it known that I, GUSTAVUS LANDMANN, a subject of the Emperor of Germany, residing at Hartford, in the county of Hartford and State of Connecticut, have invented certain new and useful Improvements in Screw-Making Machines, of which the following is such a full, clear, and exact description as will enable any one skilled in the art to which it appertains to make and use the same, reference being had to the accompanying drawings, forming part of this specification.

My invention relates to a machine for automatically making screws and other small turned articles—such as fancy nuts, knobs, balls, fancy screws, and washers, &c.—from the end of a metal rod or wire, and the features embraced by the invention are as follows: a tool-holder carrying a set of tools and having capacity of reciprocation toward the screw-rods, which are carried by running screw-rod-supplying spindles mounted in a stationary stock, whereby such tools may be advanced upon and withdrawn from the screw-rods in the direction of the lengths of the same, and having capacity of step-by-step rotation about its axis, whereby the tools may be rotatively shifted, so as to be presented in succession to the several screw-rods; the improved feed-chuck-operating mechanism, which is operatively connected with the reciprocating tool-holder carriage, and which comprises adjustable parts, so that the period during which the feed-chucks remain open may be regulated, thereby regulating the length of the screw-rod fed; the intermittent unthreading motion of the threading-die tool, such motion being derived from the continuously-rotating driving-shaft for the rod-supplying spindles through means of clutches and being timed by the movements of the tool-holder carriage; the operating mechanism for the feed-clamps, the same being also controlled by the movements of the tool-holder carriage; the step-by-step rotating motion for the tool-holder and the locking device therefor; the reciprocating means for the carriage, which is driven with a variable speed, and the novel construction and mounting of the carriage; the step-by-step rotating tool-turret arranged concentrically with the circle of feed-spindles and rotating in unison with the tool-holder and projecting its tools laterally against the screw-rods, and the means for effecting such projection of the tools through connections intermediate the tool-turret and tool-holder; the peculiar mandrel intermediate the rod-supplying-spindle stock and the tool-holder; the arrangement of the spring-pawls carried by a reciprocating body and the notched slide-bars sliding in a slotted member and intermittently engaged by the pawls, whereby an intermittent motion may be communicated from a continuously-reciprocating body to the slide-bars; and the invention further relates to the novel and peculiar constructions and arrangements of the various details of the machine, all as hereinafter fully described, and pointed out in the claims.

The important advantages of the machine are its great capacity for rapidly turning out work and the complete automatic action of the machine, which may be run continuously with little or no attention from the operator.

I have illustrated in the accompanying drawings a machine embodying my invention, and in which—

Figure 1 is a side view of the machine. (Shown with a few parts thereof omitted.) Fig. 2 is an enlarged view of the main part of the complete machine, the same being broken away toward the left-hand end thereof. Figs. 3 and 4 together represent an enlarged sectional view taken longitudinally on a vertical plane through the center of the machine, the supporting-framing being broken away and the mechanism at the right-hand end of the machine for reciprocating the tool-holder carriage being omitted, parts of the machine also being shown in full and parts thereof being broken away. Fig. 5 is a detached partial view of a cam-lever and a wedging sleeve and collar for actuating a feed-clutch. Fig. 6 is a left-hand end view of part of the machine. Fig. 7 is a perspective view of a wedging-collar. Fig. 8 is a top plan view of the two coöperating slides and the automatic grip-and-release device for imparting to one of the same an intermittent motion for operating the feed-clutches. Fig. 9 is a similar view to that shown in Fig. 8, but with such parts in different positions. Fig. 10 is a sectional view taken on a horizontal plane through the axis of the mandrel, and shows part of the mechanism for operating the clutch-plunger. Fig. 11 is a sectional view of parts of the machine, taken on the plane indicated by the line 11 11, Fig. 4. Fig. 12 is an enlarged sectional view of a portion of the step-by-step rotary tool-holder and its annular bearing, with the locking-latch for periodically locking the holder against rotation. This view also shows a plan of the fixed horizontal cam for locking and unlocking the holder. Fig. 13 is a sectional view taken on the plane indicated by the line 13 13, Fig. 3. Fig. 14 is an enlarged partial view in section on the line 14 14, Fig. 13. Fig. 15 is an enlarged plan view of a portion of the mandrel adjacent the tool-turret, a part of which is also shown. Fig. 16 is a sectional view of the machine, taken on line 16 16, Fig. 4. Fig. 17 is a right-hand end view of the machine shown in Fig. 2. Fig. 18 is a detailed view of parts of the mechanism for operating the feed-clamps. The left-hand portion of this view is in section on the plane indicated by the line 18 18 in Fig. 16, while the right-hand portion thereof is a top plan view of the spring-pawls mounted on the reciprocating yoke-frame of the carriage.

In the accompanying drawings like numbers of reference designate like and corresponding parts throughout.

Referring to the drawings, 20 designates the framing for supporting the operative parts of the machine. Upon the framing is rigidly mounted the spindle-stock 21, comprising a horizontal bed with fixed uprights at the ends, in which are rotatively mounted a suitable number of the rod-supplying spindles 22 22, which consist in the main of two concentric tubes, one of which has a longitudinal motion upon the other, these spindles being ordinarily known as "slide-spindles." They are designed to supply and hold the screw-rods from which the screw is to be formed, and they consist each in an outer casing 23, rotatively mounted in the stand 21 and having the inner end—the right-hand end in Fig. 3—enlarged both in interior and exterior diameters.

Within the casing 23 is the clutch-tube 24, which is adapted to move endwise therein, and is provided at the right-hand end with the ordinary form of spring-clutch 25, consisting of a tube with a thickened end split into sections or fingers, which have a tendency to spring outwardly. This clutch is mounted within the enlarged end of the casing, so that the thickened outer end thereof engages the inwardly-beveled mouth 26 of the casing. The screw rod or stock 27 lies within the clutch-tube 24, and is clamped by the clutch when the clutch-tube is drawn in the direction of from right to left in the views, and is released thereby when such tube is moved slightly in an opposite direction. The principle of operation of this clutch is old. However, I employ novel means for operating the same. The means are as follows: The outer end—the left-hand end in Fig. 3—of the clutch-tube 24 is formed with a hub 28, having a straight inner face engaged by the split wedging-collar 29, which surrounds the smaller diameter of the clutch-tube, and is formed with the two wedge-shaped lugs 30, and has an inclined inner face, which takes against the oppositely-inclined face of the hub 31, which is located upon the outer end of the casing 23. The tendency of the spring-collar 29 is to lie loosely about the clutch-tube, so that when the normally-spaced lugs 30 thereof are forcibly drawn together the inclined face of the collar, engaging the fixed hub 31, will slide on the same and move the collar outwardly, so as to abut against the hub 28, and thereby draw the clutch-tube outwardly and close the clutch tightly on the screw-rod passing therethrough.

The lugs 30 of the wedging-collar are forced together by means of the sleeve 32, which slides to and fro over the hub 28 and is provided on the inner edge with a V-shaped notch 33, as clearly shown in Figs. 3 and 5, and this notch engages the inclined faces of the lugs 30, so that upon the inner movement of the sleeve 32 the lugs of the collar will be drawn together and the clutch closed. The sleeve 32 is reciprocated by means of the rocking cam-lever 34, which is fulcrumed at 35 on the fixed arm 36 and is formed with a forked end having the two oppositely-projecting pins 37 37, which project inwardly into the annular recess or groove 38, formed around the circumference of the sleeve. The wedging-sleeve is free to rotate in the fork of the cam-lever 34, which in rocking on its pivot will slide the same inwardly and outwardly over the hub 28 and will engage and disengage the lugs of the collar, thereby actuating the clutch-tube and clutch, as before described.

All the parts of the rod-supplying spindles 22 22 rotate, each spindle being driven by a pinion 39, meshing with the large gear 40, which is driven by the drive-shaft 41, mounted centrally in the stock 21 and provided with a band-pulley 42, which may receive its motion from a suitable counter-shaft by means of the usual belting.

Any desired number of screw-rod-supplying spindles, such as 22, may be used, the number thereof depending upon the number of screws it is desired to make at the same time, and also upon the number of operations it is desired to perform upon the blank ends of the screw-rods. For instance, if it be desired to make one screw at a time, and such screw is to have a set of four tools of the tool-holder to act upon it, in order to properly shape the shank by turning it down and to taper and thread it there will necessarily have to be four rod-supplying spindles, each supplying and supporting a blank screw-rod, as will be more fully understood from the hereinafter-given description of the principal function of the reciprocating and rotating tool-holder.

The rod-supplying spindles are to be disposed equidistant, parallel, and on a circle concentric with the drive-shaft 41. In the construction of the machine herein illustrated I have shown the same equipped to make two screws simultaneously, and therefore there are accordingly eight rod-supplying spindles 22, which are preferably mounted horizontally and as before described.

The pivoted cam-levers 34 34 (eight in number) have one end thereof curved about in a quadrant and are provided with an anti-friction roller 43, (Figs. 3, 5, and 6) arranged to take into the cam-groove 44, formed on the periphery of the vertical cam-wheel 45, which is secured to and turns with the rotative shaft 46, extending through the post 47, which is fixed upon the machine-frame. Upon the outer end of this shaft is fixed the cam-drum 48, the surface of which is formed with the zigzag camways 49, running transversely of the surface thereof and corresponding in number to the number of rod-supplying spindles employed. In the present instance there are eight such camways 49, the exact shape of which will be understood from the views given in Figs. 1 and 3, especially in the latter.

The bent fulcrum-arms 36 for the cam-levers 34 have their outer ends extending horizontally, and the arms are disposed radially and equidistant on the head of the post 47, with which they may be formed in a single casting.

The cam-groove 44 of the cam-wheel 45 has in its path one turnout or curve—such as 50—for each screw that the machine is equipped to make at the same time. Accordingly there are two such turn-outs in the groove shown. These turn-outs are to be equidistant and are to curve inwardly toward the center of the machine, since they are designed to throw inwardly the ends of the cam-levers 34 in order to open the clutches 25, through which the screw-rods 27 are then to be fed. The cam-wheel is so adjusted that at each one-eighth part of a revolution thereof a cam-lever will pass around each turn-out, thereby rocking the levers. The passage of the cam-lever through the turn-out is made in two movements with a dwell between them, and it is during this dwell or pause of the levers in the turn-outs that the rods 27 (one for each screw to be simultaneously made) are to be fed, and thus the amount of feed, and consequently the length of the screw, is determined by this dwell.

The requisite intermittent motion is imparted to the cam-wheel 45 through means of the cam-drum 48, which is advanced step by step by the following mechanism embodying an adjustable feature, whereby the dwell period of the cam-levers may be regulated at will. The said mechanism consists in the horizontally-reciprocating slide 51, moving on ways 52 and having a vertical extension, the head of which carries an anti-friction roller 53, which projects in and moves along the camways 49 of the cam-drum as the slide reciprocates, thereby effecting the step-by-step motion of the cam-drum. (See Figs. 1, 6, 3, 8, and 9 for construction of slide 51 and its connected mechanism.)

The slide 51 is engaged by an automatic grip-and-release device and also by another horizontally-reciprocating slide 54, traveling also on the ways 52 of the machine-bed and carrying the main part of the grip device. Said grip device should essentially comprise an automatic coupling or grip co-operating with the two slides 51 and 54, so that upon the outward traverse of the slides they may be united, then disunited, and again united, in order to allow the slide 51 to remain at rest a suitable period when the head thereof has reached about the middle of the cam-drum in its inward traverse thereacross, thereby securing the requisite dwell period to accomplish the feed in. I have shown this grip-and-release device as consisting of a spring-actuated coupling or grip 55, comprising two members pivoted at 56 to the slide 54, the members having gripping-jaws and their other ends provided with a spring 57, the gripper being substantially a pair of spring-pliers. This automatic grip 55 engages with its jaws the two coupling-pins 58 58, which are adjustably mounted by means of a washer and nut in the vertical slot 59, formed in the slide 51, so that these pins may be adjusted relatively to each other. (See Figs. 6, 3, 8, and 9.) The upper ends of these pins are formed angular, as will be seen clearly from the plan views in Figs. 8 and 9, so as to allow the grip 55 to secure a better hold.

Figs. 3 and 9 show the slides 51 and 54 at their inner or left-hand limit of traverse. When the slide 54 is moved outwardly, it meets slide 51 and pushes it ahead of it to its outer limit, as shown in Fig. 8. During these movements the grip 55 has snapped over the left-hand pin 58, so that upon the inward traverse of slide 54 the grip being coupled with said pin will continue to draw slide 51 inwardly until the inner ends of the members of the grip strike against the fixed trip-studs 60 60, which are suitably spaced and depend from a cross-piece on the machine-frame, (see Figs. 6, 3, 8, and 9,) in the two latter of which the relative positions of the studs are shown dotted in. When the studs 60 engage the grip 55, the jaws thereof will be forced open and made to release the left-hand pin 58, thereby leaving slide 51 at rest in the middle of its inward traverse until by the continued inward movement of slide 54 the grip is brought into engagement with the right-hand pin 58, whereby the slide 51 again takes up the motion of slide 54 and moves with it to the inner limit.

It will now be evident that the length of the period during which the clutches 25 are left open for the feed will depend upon the relative adjustment of the coupling-pins 58 58.

The slide 54 receives its motion from the reciprocating tool-holder carriage 62 through means of the intermediate connecting-rod 63, which is adjustably attached to slide 54, preferably by means of a slot and set-screw, as shown, though any other attaching means will answer. The other end of this rod 63 passes loosely through an eye 64, formed in the push-piece 65, depending from the annular bearing 66, which, together with the U-shaped yoke-frame 67, comprises the main part of the tool-holder carriage 62. In its motion the push-piece 65 plays between and engages at each limit of traverse the respective stops 68 68, Fig. 4, which are adjustably mounted on the rod 63, whereby the range of reciprocation of slide 54 may obviously be regulated.

The yoke-frame 67 of the carriage 62 is attached to the annular bearing 66 at diametrically-opposite points thereof and makes right angles with the plane of the same, as will be seen from Figs. 1, 2, 4, and 17. Each side of the yoke-frame is provided with an angular guide-rib 68, which take into oppositely-arranged guideways 69 69, preferably formed near the longitudinal edges of the semi-cylindrically-shaped bed-plate 70, which is secured rigidly to the machine-frame, and is so constructed as to place the plane of reciprocation of the yoke-frame at an angle to the horizontal. (See Figs. 2 and 17.)

The guideways 69 are sunk in grooves in the bed 70, and are removably secured in position by the bolts 71 71, so that these bearings may be readily replaced. In place of having the curved bed-plate 70 for the yoke-frame to slide in, a bracket may be arranged upon one side of the machine-frame to support the elevated side of the yoke-frame, while the lower side thereof may be sustained in a bearing located directly upon the machine-frame.

The advantage of having the yoke-frame open and reciprocating in an inclined plane is that easy access may be had to the working parts of the machine, which are located within the yoke-frame, as hereinafter described.

The longitudinal axis of the yoke-frame is in true axial alignment with the drive-shaft 41, and the power for reciprocating the same is applied directly on this axial line by means of the rocker-bar 72, which rocks in the vertical direction, and is pivoted at 73, and is hinged at its upper end to the central boss 74 of the yoke-frame. This hinge-joint has a requisite amount of play to prevent the rocker from exerting an upward pressure on the yoke, as it would otherwise do, since its upper end describes an arc about its pivot 73. (See Figs. 1, 2, and 17.)

The rocker-bar is vibrated through means of the attached cam-stud 75, which may be provided with an anti-friction roller for taking in the heart-shaped cam-groove 76 on the rotating cam-disk 77, driven by shaft 78, which is journaled in the machine-frame and is rotated by cog-wheel 79, worm 80, and band-wheel 81, to which latter a driving-belt may be attached. The heart-shaped cam-groove 76 is shaped so as to cause the tool-holder carriage 62 to be advanced inwardly toward the center of the machine with a quick and then slow movement—the slow motion being prolonged—and then to return with a quick motion, for the purpose hereinafter described.

In the annular bearing 66 of the carriage 62 is rotatively mounted a cylindrical tool-holder 82, designed to sustain all the tools which approach the work in the direction of the length of the same—such as threading, hollow-box, mills, and turning-down tools, taps, drills, &c. The rotary holder is also adapted to carry the peculiar feed-clamps for drawing out and feeding the screw-rods.

Through the center of the vertically-mounted tool-holder 82 extends the mandrel 83, the other end of which is rotatively supported by the bearing 84, located in the spindle-stock 21, and which is capable of slight endwise adjustment by means of the annular washer-plate 85, held in position by the screws 86. The tool-holder is adapted to slide back and forth over the mandrel and to impart to the mandrel its step-by-step rotative motion, which is effected through the following means: From the periphery of the tool-holder 82 project a set of equidistant radial push-pins 87 87, which are double in number the number of tools (exclusive of the feed-clamps) carried by the holder. In the present machine there are eight of the push-pins, and the tool-holder is given intermittently one-sixteenth partial revolutions by virtue of the push-pins in turn engaging the operating-cam 88 when the carriage retreats. The cam 88 is peculiarly shaped, and consists in a plate having a curvature of surface parallel to that of the tool-holder, and with a lower straight edge and an upper irregularly-shaped edge, affording the inclines 90 91 and the straight portions 92 93. (See Figs. 4 and 11. As the carriage advances, one of the push-pins 87 travels along near the lower edge of the cam 88, and, approaching the end of the same, it trips by the spring-finger 94, which is mounted on the cam and will move only one way, so as to allow a push-pin to pass in one direction, but not in the other. Upon the reverse motion of the carriage the finger 94 will compel the said pin to move up onto the cam-edge 90. The continuous retreat of the carriage forces this pin over surface 90, thereby giving the tool-holder one-sixteenth of a revolution, then over the horizontal surface 92 without giving any rotary motion to the holder, then up the second incline 91, thereby imparting a second one-sixteenth revolution to the holder, then over the straight part 93 without moving the holder. Thus it will be understood that the number of inclines and straight surfaces of the cam 88 accord with the number of turns of the receding holder. The cam 88 is supported upon a frame-work 95, secured to the machine-frame, though any suitable means for sustaining the cam may be used.

Between each partial revolution of the tool-holder the same is held against rotation by a locking device, (shown in detail in Fig. 12,) and which consists in a bolt 96, working in a perforation 97, formed horizontally through the annular bearing 66, and having its foot taking into the bolt-holes 98, which are formed in the tool-holder and register with the bolt, which, being under pressure of the spring 99, will snap into the holes as they are presented to it. The bolt is withdrawn from the bolt-holes by the action of the presser 100, which lies in socket 101, formed in the bearing 66, and which has a forked inclined head 102, spanning the bolt 96 and engaging with its inclines the pins 103, projecting laterally from opposite points on the sides of the bolt. The stem of the presser 100 extends through an opening in the end of the casing 104, which is set in the end of socket 101, and the presser is held normally away from the bolt by a spiral spring 105, which passes around the presser and has its respective ends resting against one end of the casing and a collar 106, fixed on the presser. By pressing against the outer end of presser 100 the bolt 96 is withdrawn against the action of the spring 99 from the bolt-hole in an obvious manner, and then the tool-holder 82 is free to perform a partial revolution. To accomplish the periodic withdrawal of the bolt to unlock the tool-holder, I employ a stationary cam-track 107, over which the outer end of the presser 100 slides back and forth as the carriage 62 reciprocates. This cam-track is suitably supported horizontally in proper relation to the presser, and is formed with the alternate depressions 108 and elevations 109, as will be readily understood from Figs. 1, 2, 11, and 12, and particularly from the latter. It is evident that when the presser moves over the high part 109 of the cam-track the bolt will be withdrawn and the tool-holder released, and that when the low part 108 is encountered the holder will be locked against rotation. The conformation of the surface of the cam-track will control the locking and unlocking of the tool-holder, and this conformation must correspond to that of cam 88—that is, for every incline and level of cam 88 there must accordingly be a depression and an elevation on cam-track 107. To make the tool-holder more stable when locked, I place a locking device at each side of the same, as shown clearly in Fig. 11. The number of the bolt-holes corresponds to the number of partial revolutions the tool-holder has to perform to make a complete revolution.

All tools 110 carried by the tool-holder 82 are mounted in the sockets or perforations 111, extending horizontally therethrough and provided at one end with the bushings 112. The tools which are to be operated independently of the tool-holder are to be capable of sliding endwise back and forth through the sockets in which they are mounted or are to be stationary therein, according to the character of the tool. For instance, a milling or turning-down tool may be set stationarily in the tool-holder, while a threading-die should be capable both of reciprocation and rotation in its socket, so that it may be unthreaded from the work.

The tool-sockets 111 in the tool-holder are arranged parallel and equidistant in a circle concentric with and equal to the circle of disposition of the rod-supplying spindles 22, so that the tools of the holder may be brought into coincident axial alignment with the eight rod-supplying spindles 22 and carried onto the rods in a true line therewith, and may then be shifted simultaneously by turning the tool-holder one-eighth of a revolution.

I have shown a methodical arrangement of the tools 110 in the holder. The disposition of the same and their characters will depend on the work to be done, and they may be arranged in any preferred order.

The screw-threading die 113 has its stem mounted loosely in a tool-socket 111 of the tool-holder 82, and by the advancement of the carriage it is carried onto a blank screw-rod 27, with which it rotates until checked by a device hereinafter described, whereupon the thread is cut on the rod. The threading-dies are unthreaded from the work by rotating them in the same direction with the rotating work engaged thereby, but at a greater speed. I secure the unthreading motion for the dies indirectly from the spindle-driving shaft 41 by the following arrangement: I extend the spindle 41 through the axial bore or channel 114 of the mandrel 83 and journal the end thereof in the loose clutch-sleeve 115, projecting from the loose clutch member 116, and which is itself loosely mounted through the center of the vertical rotary disk 117, which is adapted to rotate in the annular bearing 118, secured upon the machine-frame.

The fast clutch member 119 is held out of engagement with its fellow member 116 by a suitable spring, and is feathered on the spindle-shaft 41 so as to slide but not to rotate thereon. The closing of member 119 against 116, by means hereinafter described, causes the latter to take up the motion of the spindle-shaft 41 and thereby drive the gear-wheel 120, which is keyed upon its outer end. The gear 120 meshes with and drives the pinion 121, which has an inwardly-projecting tubular arbor 122, through which loosely passes the stem or rod of the threading-die 113.

Upon the die-rod is mounted a clutch having a toothed tubular member 123, which slides on the arbor 122, and is provided with an oblique slot 124, into which projects a pin 125, which is secured fast to the arbor. The other member 126 of the die-rod clutch is also tubular and formed with clutch-teeth for locking with the opposed teeth of its fellow 123, and is mounted on the die-rod and provided with a spline 127, which takes into the spline-groove 128 of the die-rod. The clutch member 126 abuts against the arbor 122, and is held in such position by the spiral spring 129, which is placed about the die-rod and has its other end resting against the collar 130, adjustably set on the die-rod 110. When the carriage moves in toward the spindle-stock to carry the tools onto the work, both the main clutch 116 119 and the clutch 123 126 are open; so the connected train of gearing between the main clutch and the die-rod is at rest. The retreat of the carriage closes the main clutch by means to be described and rotates the arbor 122; but this rotation is not taken up by the die-rod until the clutch-pin 125 has traveled through the slot 124 and forced the member 123 into contact with the member 126, whereupon the die-rod is rotated at a greater speed than the shaft 41 and in an opposite direction therefrom through the intermediate multiplying gearing. When the carriage advances toward the work, the threading-die 113, which is then at rest, is pushed onto the rotating work, with which it then turns, until the spring-actuated detent 131, (see Fig. 11,) which is mounted on the inner face of the tool-holder 82, snaps into the groove 132 on the die-rod 110 and prevents it from further rotation, and as the die is now stationary it proceeds to cut the screw-thread on the rotating screw-rod, while the carriage continues its advance. As soon as the desired length of thread is cut on the screw-rod by the die, a spring-actuated trip-lever 133, which is pivoted on the tool-holder and engages the detent 131, is arranged to have its foot encounter the cam 134, (see Fig. 15,) which is located on the mandrel near the inner limit of movement of the tool-holder, and thereby to be moved into the dotted-line position, as shown in Fig. 11, so as to force the trip-lever from notch 135 of the detent to notch 210 thereof, thereby moving the detent into the dotted-line position and effecting the release of the die-rod 110 in order to allow the same to be free to rotate when the carriage retreats. A similar cam 134, near the limit of retreat of the holder, having slot 139 therefor, serves to move the trip-lever 133 in such position as to keep the detent into engagement with the die-rod in order for the detent to lock the rod upon the next advance of the carriage.

The die-rod 110 is restored to the position shown in the figures by virtue of the tool-holder engaging on its retreat the collar 130 on the rod. Since the machine shown has capacity for carrying two sets of tools in the tool-holder, there are accordingly two of the threading-die-operating mechanisms, which are arranged diametrically opposite, as will be seen from Fig. 4.

The mechanism for closing the clutch 116 119 by the retreating motion of the carriage consists in the ordinary clutch-levers 136 136, pivoted to the slide 89, which may be moved against the hub of the fast clutch member 119. The hooked heads of the clutch-levers engage with a fixed collar 137, which is on the spindle-shaft 41, while their inner ends project free and are provided with the spring-actuated cam-toes 163, which project normally in toward the shaft 41 and are arranged to swing in toward the tool-holder, though they cannot swing past the vertical in the opposite direction. Upon the shaft 41 is mounted the endwise-sliding tubular clutch-plunger 138, having an enlarged cylindrical head, which performs the function of a cam in engaging and operating the cam-toes as the plunger is slid back and forth on its shaft.

The clutch-plunger is provided with the lugs 140, projecting therefrom, and to which are pivoted the outer ends, respectively, of the slide-bars 141, which slide endwise to and fro in the longitudinal slots or ways 142, formed at diametrically-opposite places in the mandrel 83. (See Figs. 2 and 10.) The slide-bars 141 lie within the circumference of the mandrel so as not to project therebeyond, and have their inner free ends formed with the suitably-spaced notches 143 143, having oppositely-inclined ends, and the edges of the slots or ways 142 are formed with curved depressions 144 144, which from Fig. 10 will be seen to be straight in the main part with suddenly inclined or curved ends, and these depressions somewhat exceed in length the distance the notches 143 move over in the reciprocations of the slide-bars. The notches 143 are engaged by the hooked heads 145 of the pawls 146, which are pivoted to the lugs 147 and lie within the recesses 148, formed in the tool-holder 82 in the same plane upon opposite sides of the central opening thereof, which receives the mandrel. These latches are each provided with a spring 149, which normally tend to hold the pawls in engagement with the slide-bars, which lie in the same plane therewith. These pawls are provided with laterally-projecting lift-pins 150 150, which engage the edges of the slots 142 and act to lift the pawls at each end of the depressions 144, because of the inclines thereat, out of engagement with the slide-bars in an obvious manner. When the carriage has retreated to its limit, as shown in the drawings, the head of the clutch-plunger will lie between the clutch-levers and out of contact therewith, and this of course leaves the clutch 116 119 open.

Suppose the tool-holder to be advancing inwardly. As it nears the limit of such movement, the pawls 146 will snap into the right-hand or outermost notches of the slide-bars 141, which will then draw inwardly the connected clutch-plunger 138, the head of which in such passage will engage and swing the cam-toes 163 163 aside without thrusting the levers apart, thereby not operating the connected clutch. A further advance of the tool-holder will bring the lift-pins into action, and this will disengage the pawls, whereupon the slide-bars come to rest and remain idle until the pawls move over the space intermediate the notches. Then the pawls engage and disengage the other notches and again move the slide-bars inwardly, whereby the clutch-plunger is moved from between the levers. As the tool-holder retreats, the pawls again engage and disengage the slide-bars and return the clutch-plunger, step by step, in between the clutch-levers, which, on such return, are forcibly thrust apart by the head of the plunger engaging the now unyielding cam-toes 163 163. The main clutch is held closed as long as the plunger-head on its return remains in contact with the toes of the clutch-levers, the period of such engagement being regulated by the space between the notches of the slide-bars. It is during this engagement that in an obvious way the die-rods are rotated rapidly to effect the unthreading of the dies.

The range of the step-by-step reciprocation of the slide-bars will in part be regulated by the length of the depressions 144 at the edges of the slots 142. The mandrel being keyed to the tool-holder, so as to rotate therewith, the pawls are always maintained in the same positions relative to their coacting slots and slide-bars throughout the step-by-step revolutions of the tool-holder.

By virtue of the construction of a slotted member—such as the mandrel 83—having notched slide-bars reciprocating therein, and the curved depressions at the edges of the slots, and the spring-pawls disengaged from such bars by the curvature of the depressions I am enabled to impart a prescribed range of rectilinear reciprocating movement to a body from a continuously-moving member, and by having a series of the notches in the slide-bars and a series of corresponding depressions at the edges of the slots I can obviously obtain a step-by-step reciprocating motion. So far as I am aware this combination of parts for such a purpose is original with me. I employ substantially this same combination of devices in two other parts of my machine, which will hereinafter be described.

The vertical disk 117, in which the ends of the die-rods are journaled and which carries the pinions 121 121, must of course make the same partial revolutions as the tool-holder, though it is not necessary that it should reciprocate therewith. To secure the simultaneous step-by-step rotary movement of the tool-holder and disk 117, I rigidly connect the disk with the mandrel 83 by the intermediate cylinder or hollow shaft 151, which in the present construction has flanged ends, one of which is bolted directly to the disk by screws 152, while the other end thereof is secured to the back plate 153 by screws 154, the back plate being fixedly attached to the mandrel by means of bolts 155. In this way the rotation of the tool-holder produces a simultaneous motion of the disk, while the reciprocation thereof does not affect the disk or the intermediate connecting-shaft, which is arranged concentrically around the spindle-shaft and incloses the main clutch 116 119. Other suitable means than what I have shown may be adopted to impart to the disk the precise step-by-step rotating movements of the tool-holder.

At the required time the screw-rods 27 27 are drawn through the rod-supplying spindles and fed a certain length by the following mechanism: A feed-clamp 157 is rotatively attached to a rod 156, which is mounted in one of the sockets 111 of the tool-holder and may be moved longitudinally in either direction in its socket, but cannot be turned therein, because of the key 158 on the tool-holder extending into the keyway 159 on the rod. (See Fig. 11.) The feed-clamp is disposed parallel to the rod-supplying spindles and on the circle upon which the tools are arranged in the tool-holder. This clamp 157 consists in a split spring-tube the internal diameter of which is a little smaller than the diameter of the screw-rods 27, so that when the clamp, which may have an inwardly-tapering mouth, is forced onto the screw-rod it will securely clamp it with a spring-grip. The eight tools in the tool-holder already alluded to, being equidistant, are of course one-eighth of the circle apart. The feed-clamps, however, are each placed intermediate two of the tools, and are therefore one-sixteenth of the circumference from each said tools, as will be readily understood from Fig. 11. When, therefore, the tools in the tool-holder are in axial alignment with the respective rod-supplying spindles, the feed-clamp is directed to a point midway of two of such spindles. This arrangement is so designed because the feed occurs as the carriage retreats and when the tools are shifted out of alignment with the spindles. It is for this reason that in the one-eighth partial revolution of the tool-holder, which shifts them each into alignment with the next following spindle, a pause is made, or, in other words, the tool-holder is given sixteen partial revolutions to make a complete one, the partial turns being effected by the push-pins 87 and the cam 88, as before explained.

The feed-clamp rod extends loosely through the disk 117, Fig. 18, and has adjustably mounted on it a collar 161, (see Fig. 2,) against which takes one end of the spring 162, which surrounds the rod and has its other end abutting against the face of the disk 117. The spring 162 exerts an inwardly-directed pressure on the rod, which, until the feed motion occurs, is restrained from moving inwardly by the Y-shaped feed-forks 164 164, mounted on the rotating disk 117 and projecting in toward the center thereof. The end of the stem of each feed-fork is formed with a notch 166, working over a pin 167, fixed in the ears 168, which are secured to the annular sliding fork-carrier 169. This carrier may be slid back and forth and also rotated on the fixed arbor 170, which is attached by its right-hand end to the pillar 180 and extends horizontally in toward the center of the machine in axial alignment with the spindle-shaft 41. The carrier is provided with an interior annular shoulder 171, facing the disk 117, and against which takes the projection 172 on the inner ends of the slide-bars 173, which are provided with notches 174 and are arranged to reciprocate in slots 175, having curved depressions 176, and which are engaged by the spring-actuated pawls 177, mounted on the projection 178 of the yoke-frame 67 of the carriage. The annular feed-fork carrier 169 being rotatable about the arbor and having the annular shoulder therein for engaging the slide-bar projections, it will be enabled to perform its functions no matter in what position the rotating disk 117 may place the attached feed-forks, as will be obvious from Fig. 16. The hooked heads of the pawls 177 are provided with the pins 179, the construction and operation of these slide-bars 173 and the co-operating pawls 177 being substantially the same as the bars and pawls hereinbefore described, except that the pawls here have one end of their heads only formed with a shoulder or hook to engage the notches in the bars, for in this case it is only sought to give the bars an outward movement by the pawls, the reverse movement of the same being secured by means of the spring 181, which is fastened upon the under side of the arbor 170 and presses with its free end against the fork-carrier, tending to keep it in to its inner limit of movement. This spring acts to restore the carrier to the position shown in the several views after the same has been drawn outwardly and released by the pawls 177.

One of the prongs of the feed-fork 164 is designed to engage a notch 182, formed in the side of the feed-clamp rod, and to hold the rod against the action of the spring 162, before alluded to. When the carriage advances, the parts of the feed-clamp operating mechanism just described remain undisturbed; but when the carriage retreats the active push-pin 87 moves up incline 90 of the cam 88 and brings the feed-clamp into alignment with a rod-supplying spindle. At this time the prongs of the feed-forks are thrown inwardly by means of the pawls 177 and the co-operating parts intermediate the same and the forks. This releases the feed-rod from the restraint of the feed-fork and leaves it under influence of the spring 162, which then shoots it forward and presents the feed-clamp to the oppositely-disposed screw-rod 27, onto which it is forced by the pressure being now exerted upon the end of the feed-clamp rod by virtue of the outermost prong of the feed-fork engaging and pushing on the end thereof.

When the feed-clamp has been forced firmly onto the screw-rod, so as to secure a hold on it, the continued retreat of the carriage will bring the back of the tool-holder into contact with the collar 167 on the rod, and as the feed-clutches are now opened by the mechanism hereinbefore described the screw-rod will be fed forward a length by the outward movement of the feed-clamp rod. The closing of the feed-clutches on the screw-rods will prevent the feed-rods from further drawing them out by compelling the feed-clamps to slip off the screw-rods as the carriage retreats farther.

Where tools are used in the tool-holder which do not require rotation on their axes or reciprocation in the holder, the same may be set stationarily in the holder on short rods which do not extend through the holder, as indicated in the drawings.

I have described fully the means for operating the tools which approach the work in the direction of the length of the same and also the feed-motion.

I will now proceed to describe the sustaining and operating mechanisms for the tools, which are introduced to the work laterally, such tools comprising forming, knurling, and cut-off tools.

The mandrel 83 near the spindle-stock 21 is provided with a hollow drum-like tool-turret 183, which is shown as preferably cast with the mandrel, though it may be constructed separately therefrom in any suitable preferred manner. This turret rotates step by step with the mandrel about a horizontal axis and is provided with a set of tables or platforms 184, which may be arranged radially or arranged with their planes parallel with the radii of the turret or in any preferred way, so that they may serve as beds for the movable tool-slides 185 to reciprocate on.

Upon each tool-slide is a suitable tool-clamp 186, designed to hold any character of tool which it may be desired to use in the turret. The slides are each held normally forced in toward the center of the turret by means of a coil-spring 187, which is arranged with one end taking against the end of the cavity 188, formed in the table 184, and with the other end thereof pressing against a projection 189, which extends from the tool-slide into the cavity. (See Figs. 13 and 14.) Though only one of the spring-retractors for the tools is shown, it is intended in practice to have each tool-slide for which it may be necessary automatically retracted by a spring in substantially the manner shown.

The inner ends of the tool-slides are provided with a bent arm 190, carrying an anti-friction roller 191, for engaging the slide-projecting tube 192, which is arranged within the chamber or recess 193, formed in the mandrel. This tube loosely incases a sleeve 194, which loosely surrounds a part of the spindle-shaft 41. The slide-projecting tube is cylindrical and is formed with a conical section 195 near its center of length, and at one end (the outer one) it is provided with an annular lip 196. The tube has a limited range of reciprocation over the sleeve 194, and is held at the inner limit of such reciprocation by the spring 197, which exerts an inward pressure on the end of the tube and serves to quickly force it back to the position shown whenever it is drawn to the outer limit (the right hand) and released. When this tube is moved to the right, it is manifest from Figs. 3 and 13 that the conical portion 195 thereof will simultaneously project the several tools from the tool-turret into lateral contact with the screw-rods in the rod-supplying spindles. The points where the turret-tools meet the screw-rods may be determined accurately by the adjustment of the tools on their slides. As the mandrel rotates step by step, the different tools in the turret may be presented in succession to the different pieces of work in the rod-supplying spindles.

I have shown eight of the tool-slides in the turret and each provided with a tool, thus making two sets of laterally-operating tools for turning out the two screws at a time, this being considered the capacity of the illustrated machine. The set of tools shown in the turret may be supposed as two forming-tools 198 199, a knurling-tool 201, and a cutting-off tool 200, which act in the stated succession upon the work, the last one acting to sever the screw from the rod. These tools may be supposed, for the sake of illustration, as designed to cut a fancy-headed screw with a milled edge, as indicated at 27 in Fig. 3, wherein, however, the thread is not shown as cut on the rod.

The projecting tube is moved outwardly to effect the periodic projection of the turret-tools at each retreat of the carriage by means of the spring-pawls 202, which are pivoted at 203 in the recesses 204, which are formed in the same plane in the tool-holder 82, and in which are springs 205, for pressing upon the pawls. Upon the advance of the carriage to the inner limit the pawls are forced through the lateral openings 206 cut in the mandrel, so as to give them access to the lip 196 of the projecting tube. The pawls being in engagement with the tube, as the carriage retreats they draw out the tube, and thus throw the turret-tools into operation in an evident manner. Upon the continued retreat of the carriage the pawls are automatically disengaged from the projecting tube by their bodies sliding over the inclines 207 of the openings 206 and moving them clear of the lip on the tube.

To give a desired stability to the tool-turret when the tools thereof are under stress when at work, and to prevent any backlash of the turret, I provide it with the ratchet-teeth 208, arranged circumferentially there around, and into which the spring-clicks 209 slip at each rotative step of the turret.

The operations of the machine may be described as follows: The machine shown being equipped to make simultaneously two screws, which are each acted upon by a set of laterally-operated tools and a set of longitudinally-operated tools, the machine is accordingly provided with eight tools in the tool-holder and eight tools in the tool-turret, and is also provided with two feeding mechanisms for feeding to the machine the blank screw-rods 27 27, which may be supplied to the spindles as a continuous wire. The carriage 62, which carries the step-by-step rotating tool-holder 82, being at its outer limit of retreat, the parts of the machine assume at this time the relative positions shown in the drawings. The turning of cam-wheel 77 at first rapidly advances the carriage toward the continuously-running rod-supplying spindles until the tools in the tool-holder approach the work held in the spindles, at which time the speed of the carriage slackens and continues slow while the tools are engaging the work, which is securely gripped in the spindles throughout such engagement. By the time the carriage completes its advance the tools in the holder have each accomplished their especial work and the carriage begins to retreat slowly, then quickening its speed, and retires to the outward limit, as will be understood from the peculiar outlines of the cam-groove of wheel 77. Upon its retreat the carriage moves outwardly the slide-projecting tube 192, which projects the tools from the tool-turret 183 into lateral contact with the work held by the spindles, and two of these tools sever the screws from the screw-rods which have previously been acted on in succession by the tools. The carriage in advancing having moved the two slides 51 and 54 to the left-hand limit, it will, upon its retreat, partially rotate cam-drum 48 and cam-wheel 45, thereby opening the feed-clutches 25, which, remaining open during the separation of the two slides 51 and 54, allow the feed-clamps, which have by this time been shifted into opposite alignment with the screw-rods from which the work has just been severed, to draw the screw-rods through the feed-rod-supplying spindles, while the feed-clutches remain open as the carriage continues its retreat. By the continued retreat of the carriage the slide 54 is again united to the slide 51, thereby closing the feed-clutches and stopping the feed, the feed-clamps being withdrawn from the screw-rods by the recession of the carriage, which also effects the necessary rapid rotation, as hereinbefore described, of the threading-dies for unthreading the dies. Before the carriage has completed its retreat the tool-holder has been turned through a second one-sixteenth part of a revolution by a push-pin moving over incline 91 of cam 88, thereby shifting the tools in the holder into axial alignment with the work and presenting them each to a new screw-rod, which, at the previous advancement of the carriage, had been operated upon by the tool ahead of the same in the set, so that, for instance, the first tool of a set is presented to the newly-fed screw-rod, the second tool to the screw-rod just previously acted on by the first tool, and the third tool to the rod previously encountered by the second tool of the set, and so on successively through the series of the sets of tools in the holder.

There will of course be a practical limit to the number of sets of tools that may be employed, though it is evident that two screws may be readily made at a time, as described. The machine is to be made of suitable metals for the various different parts thereof.

The organized machine which I have shown and described may have many modifications made in the various parts thereof without, however, making a substantial departure from the spirit of my invention, which, I consider, has a broad scope in several of its features, as described, shown, and claimed. I therefore wish to be understood as not limiting myself to the exact constructions shown.

Having thus described my improvements in screw-making machines, what I claim as my invention, and desire to secure by Letters Patent, is—

1. In a screw-making machine, the combination of a set of running rod-supplying spindles mounted in a stationary stock supplying the screw-rods to the machine, and a step-by-step rotating tool-holder having a reciprocating movement and provided with a set of tools, whereby the tools of the holder may be presented to the work and withdrawn therefrom and the holder rotatively shifted, and said operations repeated, so that the said tools may be presented in succession to the work.

2. In a screw-making machine, the combination of a set of running rod-supplying spindles mounted in a stationary stock in a circle and supplying the screw-rods to the machine, a step-by-step rotating tool-holder adapted to be moved toward and away from the rod-supplying spindles on the line of length of the same and having a set of tools arranged on a circle concentric with the circle of the spindles, whereby the tool-holder may advance toward the spindles, retreat therefrom, and then be rotated, and these operations repeated, so as to present in succession each one of a set of tools in the holder to the rods carried by the spindles.

3. In a screw-making machine, the combination of a set of running rod-supplying spindles mounted in a stock and disposed equidistant on a circle and supplying the rods to the machine, a tool-holder adapted to move toward and away from the said spindles on the line of length of the same, and provided with a set of tools arranged equidistant and on a circle concentric with the circle of the said spindles, the tool-holder acting to simultaneously move the tools longitudinally into contact with the work and to withdraw them therefrom at each reciprocation, the tool-holder and said spindle-stock having a relative step-by-step rotative movement to permit the successive engagement of the tools with the screw-rods.

4. In a screw-making machine, the combination of a set of running rod-supplying spindles mounted in a stock and disposed on a circle and supplying the screw-rods to the machine, a tool-holder adapted to move toward and away from the spindles in the direction of the length of the spindles, a set of independently-operated tools mounted in the tool-holder and arranged in a circle concentric with the circle of the spindles and adapted to be simultaneously carried by the tool-holder into contact with the rods in the spindles, the tool-holder and the said spindle-stock having a relative step-by-step rotating movement to permit the successive engagement of the tools and the work.

5. In a screw-making machine, the combination of a set of running rod-supplying spindles supplying the screw-rods to the machine and mounted in a stationary stock and disposed equidistant in a circle, a step-by-step rotating tool-holder adapted to move toward and away from the spindles in the direction of the length of the same and making partial revolutions upon its recession, a set of tools mounted in the tool-holder equidistant in a circle concentric with the circle of the said spindles and arranged correspondingly therewith, a feed-clamp mounted in the tool-holder midway between two of the tools and on the circle therewith, whereby at each recession the tool-holder by its partial revolutions may bring the feed-clamp and then the tools into axial alignment with the feed-spindles, and adapted to be periodically thrust forward to grasp the blank screw-rod to be fed when the same is brought into alignment therewith, such feed-clamp being retracted by the further recession of the tool-holder to feed the grasped rod a predetermined length, so that upon advancement of the tool-holder the tools being in alignment with the work are carried onto the same, and upon retreat the tools are shifted out of alignment, while the feed-clamp is shifted into alignment with the rod to be fed and grasps and feeds the rod for a certain length, and then the tool-holder is again shifted, bringing the tools into alignment with the spindles for a repetition of said operation.

6. In a screw-making machine, in combination, a set of running rod-supplying spindles mounted equidistant in a circle in a stock and supplying the rods to the machine, a tool-turret provided with a set of reciprocating tools adapted to be projected and retracted therefrom, so as to engage the screw-rods laterally, and arranged with its axis coincident with the center of the circle of disposition of the spindles, the said spindle-stock and the tool-turret having a relative step-by-step rotative movement, whereby the tools of the turret may be introduced in succession to the screw-rods.

7. In a screw-making machine, in combination, a set of running rod-supplying spindles mounted in a stationary stock and disposed equidistant in a circle and supplying the screw-rods to the machine, a step-by-step rotating tool-turret concentrically arranged with the circle of the spindles and provided with a set of reciprocating tools disposed radially and equidistant in the turret, and the tools adapted to be periodically projected and retracted, so as to encounter the screw-rods laterally, the step-by-step rotative motion of the turret permitting the tools thereof to be presented in succession to the screw-rods.

8. In a screw-making machine, in combination, a set of running rod-supplying spindles mounted in a stationary stock and disposed equidistant in a circle and supplying the screw-rods to the machine, a step-by-step rotating tool-holder provided with a set of tools disposed equidistant in a circle about the axis of rotation of the tool-holder concentric with the circle of the spindles, a rotative mandrel extending through the center of the tool-holder and turning step by step therewith and having a tool-turret mounted thereon and rotating therewith about a common axis, the tool-turret provided with a set of reciprocating tools disposed radially and equidistant, and adapted to be periodically projected and retracted, so as to come into lateral contact with the screw-rods, whereby the step-by-step rotating motion of the tool-holder may be imparted to the tool-turret through means of the mandrel.

9. In a screw-making machine, the combination of the suitably-mounted step-by-step rotated mandrel having a drum-like tool-turret mounted concentrically thereon and rotating therewith and provided with a set of radially-disposed reciprocating tool-slides having the retracting means, a chamber formed in the mandrel and into which the inner ends of the slides project, an endwise-reciprocating spring-actuated projector mounted within said chamber and provided with an inclined surface for engaging and forcing outwardly the tool-slides when the projector is moved in one direction, a tool-holder mounted concentrically on the mandrel and sliding thereover and provided with the means for engaging the tool-slide projector for a limited period in one way of its movement for imparting the requisite motion to said projector to project the slides, substantially as and for the purpose set forth.

10. In a screw-making machine, the combination of the suitably-mounted step-by-step rotated mandrel formed with an interior chamber and having lateral openings communicating therewith, a tool-turret mounted concentrically on the mandrel and rotating therewith and provided with a set of spring-actuated radially-disposed reciprocating tool-slides having their inner ends projecting into said chamber, a projector mounted within said chamber and adapted to reciprocate endwise in the axial line of the mandrel, and having an inclined surface engaging the said inner ends of the tool-slides and projecting the slides when the said projector is moved in one direction, and a spring for returning the projector after such movement, a step-by-step rotating tool-holder mounted concentrically on the mandrel and reciprocating thereon and turning therewith and provided with spring-pawls for taking through said openings in the mandrel and engaging periodically the tool-slide projector within the mandrel, whereby the tool-holder in one direction of its reciprocating movement will impart its motion to the said projector to effect the projection of the tool-slides, substantially as and for the purpose set forth.

11. In a screw-making machine, the combination of a spindle-stock and the running rod-supplying spindles mounted therein, the spindle-driving shaft and the gears intermediate the shaft and spindles, the hollow rotary mandrel having lateral openings and mounted in axial alignment with the spindle-driving shaft and having an extension of the same passing therethrough and rotating therein, the tool-turret mounted concentrically on the mandrel and turning therewith and provided with a set of radially-disposed reciprocating tool-slides having springs to normally hold them within the turret, and having their inner ends engaging the conical surface of the slide-projecting tube, which lies within the mandrel and incases a sleeve mounted loosely on the extension of the spindle-driving shaft, and the step-by-step rotating tool-holder mounted on and sliding over the mandrel and imparting its step-by-step rotating motion thereto, the spring-pawls on the tool-holder acting to periodically engage the projecting tube, so as to move the tube endwise and project the slides from the turret, substantially as and for the purpose set forth.

12. In a screw-making machine, the combination, with a step-by-step rotating tool-turret provided with the periodically-reciprocating tool-slides, of the ratchet-teeth on the turret and the spring-clicks for engaging said teeth to prevent the turret from moving one way, substantially as described.

13. In a screw-making machine, in combination, a set of running rod-supplying spindles mounted in a stationary stock and disposed equidistant in a circle and supplying the screw-rods to the machine, a reciprocating carriage having a step-by-step actuated tool-holder mounted thereon with its axis of rotation parallel with the plane of reciprocation of the carriage and including the center of the circle of the said spindles, a set of tools mounted in the tool-holder, so as to be brought into opposite alignment with the spindles, such tools including the threading-tool and all tools designed to move upon the work in the spindles longitudinally relatively thereto, whereby such tools may be carried onto and withdrawn from the work, then shifted and presented again, and so on, in order that each screw-rod may have such tools act upon it in succession.

14. In a screw-making machine, the combination, to effect the unthreading motion for the threading-die with the spindle-driving shaft, of the reciprocating carriage having the tool-holder rotatively mounted thereon, the threading-die having its supporting-rod mounted loosely in the tool-holder, a clutch mounted on the spindle-driving shaft and having the loose member thereof connected with the said die-supporting rod through means of speed-multiplying gearing, the clutch being periodically operated by the tool-holder in its reciprocations, the retreat of the holder effecting the closing of the clutch and the consequent rotation of the threading-die.

15. In a screw-making machine, the combination, with the running rod-supplying spindles disposed equidistant in a circle and supplying the screw-rods to the machine and a centrally-disposed shaft for driving the spindles, of a reciprocating carriage having a step-by-step rotating tool-holder mounted thereon and having a set of tools, including the threading-die, disposed equidistant in a circle concentric with the circle of the spindles, the said driving-shaft passing through the axis of rotation of the tool-holder, and a clutch mounted on the said shaft and periodically operated by the reciprocations of the tool-holder, multiplying-gearing intermediate the loose member of said clutch and the threading-die rod in the tool-holder, whereby upon the closing of the clutch the threading-die may be rotated at a greater speed than its co-operating rod-supplying spindle and in the same direction therewith.

16. In a screw-making machine, the combination, with the set of running rod-supplying spindles mounted in a stationary stock and disposed equidistant in a circle and supplying the screw-rods to the machine and the centrally-disposed drive-shaft for driving the spindles, of a reciprocating carriage having a step-by-step rotating tool-holder mounted thereon and a hollow rotary mandrel extending from the spindle-stock through the center of the tool-holder and having the spindle-shaft extending through its center and projecting therebeyond, one or more threading-dies mounted in the tool-holder so as to come into opposite alignment with the co-operating rod-supplying spindles, a clutch on said shaft and speed-multiplying gearing intermediate the said clutch and the threading-die rods, a movable plunger sliding on said shaft and acting to close the clutch, such plunger being connected with the notched slide-bars reciprocating in slots formed in the sides of the mandrel, and the spring-pawls mounted on the tool-holder and automatically engaging and disengaging said slide-bars to periodically move the clutch-plunger back and forth during the reciprocating movement of the tool-holder, substantially as and for the purpose set forth.

17. In a screw-making machine, the combination, with the reciprocating carriage having the step-by-step rotating tool-holder mounted thereon, of a disk rotatively mounted in a stationary bearing and rotating step by step in unison with the tool-holder, the drive-shaft extending through both the center of the tool-holder and the disk, a clutch mounted on the shaft and having its loose member driving a gear, and a threading-die rod loosely mounted in the tool-holder and the disk and provided with a gear meshing with said clutch-driven gear, the said clutch connected with the tool-holder, whereby the reciprocating movements of the holder may periodically operate the clutch, substantially as and for the purpose set forth.

18. In a screw-making machine, the combination, with the step-by-step rotating tool-holder and the disk mounted in a stationary bearing and rotating step by step in unison with the holder, of the drive-shaft extending through the center of both the tool-holder and disk, a clutch mounted on the shaft and having the loose member thereof provided with a sleeve surrounding the shaft and extending loosely through the center of the disk, and a gear-wheel mounted fast on said sleeve, a pinion having a hollow arbor loosely journaled in and extending through said disk and provided with one clutch member, a threading-die having its rod loosely mounted through the tool-holder and extending through said hollow arbor of said pinion and provided with a second clutch member coacting with the member on said arbor, whereby upon the closing of the main clutch on the drive-shaft the clutch on the die-rod will be closed and the rod rotated, substantially as and for the purpose set forth.

19. In a screw-making machine, the combination of the tool-holder and the threading-die having its sustaining-rod mounted thereon and provided with a fast clutch member, a pinion having a hollow arbor through which said rod extends, and a second clutch member mounted on said arbor and having a limited endwise play thereon, the drive-shaft, and the main clutch mounted thereon and operatively connected with the said pinion, whereby upon the closing of the main clutch the motion of the shaft is not immediately imparted to the die because of the play of said clutch member.

20. In a screw-making machine, the combination, with the reciprocating and step-by-step rotating tool-holder and the tools mounted thereon, of the disk mounted in a stationary bearing and rotating step by step in unison with the tool-holder and supporting in part the tools of the holder, which receive operations independently of the operations of the tool-holder.

21. In a screw-making machine, the combination of the reciprocating carriage having the step-by-step rotating tool-holder mounted thereon and carrying the tools, the disk rotatively mounted in the stationary bearing and having said tools extending therethrough, and the mechanism, substantially as described, for operating the tools independently of the tool-holder, the hollow mandrel extending through the center of the tool-holder, and the drive-shaft extending through the mandrel, the rigid connections intermediate the said disk and mandrel, whereby the step-by-step rotating movement of the tool-holder may be imparted to the disk through means of the mandrel and said intermediate connections, substantially as and for the purpose set forth.

22. In a screw-making machine, the combination of a set of running rod-supplying spindles mounted equidistant in a circle in a stock, a reciprocating carriage having a step-by-step rotating tool-holder mounted thereon, a set of tools mounted in the tool-holder in a circle coincident with the circle of said spindles, and a locking device for automatically locking the tool-holder against rotation between each step-by-step movement, for the purpose set forth.

23. In a screw-making machine, the combination, with a reciprocating carriage and a cylindrical tool-holder rotatively mounted thereon and provided with a set of radially-disposed push-pins, of a stationary cam arranged near the tool-holder and appropriate to be engaged by a push-pin at each retreating motion of the carriage to give the tool-holder partial revolutions, substantially as and for the purpose set forth.

24. In a screw-making machine, the combination, with a reciprocating carriage and a step-by-step rotating tool-holder mounted in an annular bearing thereon and formed with a series of bolt-holes, of a spring locking device located on said bearing and locking with the holes in the tool-holder, and a cam for engaging and operating said locking device to lock and unlock the tool-holder, substantially as and for the purpose set forth.

25. In a screw-making machine, the combination, with the tool-holder having a reciprocating motion and the threading-die rotatively mounted therein, of a locking device for the die acting to lock it against rotation when the thread is being cut, such locking device being operated by the reciprocating movement of the tool-holder.

26. In a screw-making machine, the combination, with the tool-holder and the mandrel upon which the holder reciprocates, of the threading-die loosely mounted in the holder and having its rod formed with a groove, a spring-actuated detent pivoted on the tool-holder and adapted to take in the groove of the rod, and a pivoted lever actuating the detent and having its foot engaged by the cams fixed upon the mandrel, substantially as and for the purpose set forth.

27. In a screw-making machine, the combination, with a reciprocating carriage provided with an annular bearing and a step-by-step rotating tool-holder mounted in the said bearing and provided with a series of bolt-holes, of a spring-actuated bolt mounted on the bearing and locking with the bolt-holes, a spring-actuated presser for retracting the bolt when pressed on, and a stationary cam-track having depressions and elevations thereon and arranged to be engaged by the end of the presser-rod to lock and unlock the tool-holder, substantially as and for the purpose set forth.

28. In a screw-making machine, the combination, with a reciprocating carriage having a tool-holder mounted thereon and a feed-clamp loosely mounted in the tool-holder and adapted to move endwise in its bearing, of mechanism, substantially as described, for holding the feed-clamp against movement upon advancement of the carriage and then effecting its endwise movement to force it onto a blank screw-rod upon retreat of the carriage.

29. In a screw-making machine, the combination, with the running rod-supplying spindles mounted in a stationary stock and provided each with a feed-clutch, of a reciprocating carriage having a step-by-step rotating tool-holder mounted thereon, and a feed-clamp mounted in the holder and adapted to move endwise therein, and mechanism, substantially as described, for holding the feed-clamp away from the rod-supplying spindles upon advancement of the carriage and forcing it onto a blank-rod in a spindle upon retreat of the carriage, and such retreat effecting the reverse endwise movement of the feed-clamp to feed the clamped blank-rod, the said feed-clutches connected with the said carriage and operated thereby, whereby upon the retreat of the carriage the clutch engaging the blank-rod then to be fed may be held open for such feed.

30. In a screw-making machine, the combination of the running rod-supplying spindles mounted in a stationary stock and disposed equidistant in a circle and provided each with a feed-clutch and supplying the screw-rods to the machine, a reciprocating carriage having a step-by-step rotating tool-holder mounted thereon, and a feed-clamp for each set of tools mounted in the holder and adapted to move endwise therein and to be brought into opposite alignment with a rod-supplying spindle upon retreat of the carriage, the mechanism, substantially as described, for holding the feed-clamp away from the said spindles upon advancement of the carriage and forcing it upon the blank-rod then to be fed when upon retreat of the carriage the clamp is brought into alignment with the same, and the said feed-clutches connected with and operated by the said carriage, for the purpose set forth.

31. In a screw-making machine, the combination, with a reciprocating carriage having a step-by-step rotating tool-holder mounted thereon, a disk mounted in a stationary bearing and rotating step by step in unison with the tool-holder, a spring-actuated feed-clamp mounted through the tool-holder and disk and adapted to move endwise therethrough, a feed-fork fulcrumed on the disk and engaging with one prong a shoulder on the rod of the feed-clamp to prevent one-way movement thereof, the other end of said fork adapted to press upon the end of said feed-clamp rod to force the clamp onto the blank-rod to be fed, and a spring-actuated slide engaging and operating the feed-fork, such slide being engaged and moved for a limited distance to press forward the feed-clamp by a device, substantially as described, which is operated by the retreating motion of the carriage.

32. In a screw-making machine, the combination, with the reciprocating carriage, the tool-holder mounted thereon, the disk, and the endwise-moving feed-clamp and the pivoted feed-fork engaging with one prong the rod of the feed-clamp and adapted to press with the other prong upon the end of the clamp-rod to force the clamp onto the blank-rod to be fed, of a spring-actuated slide engaging and actuating the feed-fork, the slide mounted on a stationary arbor having lateral slots formed therein and provided with the depressions, the notched slide-bars engaging said slide and sliding in said slots, and the spring-actuated pawls provided with the disengaging-pins and mounted on the carriage and engaging and moving the slide-bars as the carriage retreats, substantially as and for the purpose set forth.

33. In a screw-making machine, a reciprocating tool-holder carriage consisting in a U-shaped yoke-frame having an attached annular tool-holder bearing the plane of which is normal to that of the yoke-frame, so that access may be had to the working parts of the machine embraced within the yoke-frame, substantially as described.

34. In a screw-making machine, a reciprocating tool-holder carriage consisting in a U-shaped yoke-frame having an attached tool-holder bearing the plane of which is normal to that of the yoke-frame, and the means, substantially as described, for reciprocating the carriage, such means connected to the yoke-frame at the center of the arch thereof, so that the line on which the power is applied to the carriage may be coincident with the longitudinal axial line of the yoke-frame, substantially as and for the purpose set forth.

35. In a screw-making machine, the combination of the rotary spindle-casing having a hub at one end formed with an outwardly-inclined face, the clutch-tube extending through said casing and provided with a hub lying without the casing, a spring wedging-collar having wedge-shaped lugs at its ends and having an inwardly-inclined face adapted to engage the said inclined face of the hub on the casing, said collar disposed between the two said hubs, a wedging-sleeve sliding over the hub on the clutch-tube and provided with a notch for engaging the wedging-lugs of the collar, which is wedged in between the hubs and acts to retract the clutch-tube when the notch in the sleeve is forced on the lugs, and a lever for sliding the wedging-sleeve to and fro to effect the opening and closing of the feed-clutch.

36. In a screw-making machine, the combination, with the rod-supplying spindles for supplying the screw-rods to the machine and having feed-clutches for clamping such rods, of a reciprocating carriage carrying a tool-holder co-operating with the feed-spindles and adjustably connected with the said feed-clutches of the spindles, whereby the feed-clutches may be operated by the movements of the carriage and the period during which each clutch remains open may be regulated by the adjustment of said intermediate connections.

37. In a screw-making machine, the combination, with the rod-supplying spindles having feed-clutches and supplying the screw-rods to the machine and the reciprocating carriage carrying the tool-holder co-operating with said spindles, of a step-by-step actuated mechanism, substantially as described, intermediate the said feed-spindles and carriage for operating the feed-clutches periodically, such mechanism being operated by the continuous reciprocation of the carriage.

38. In a screw-making machine, the combination, with the rod-supplying spindles and the feed-clutches thereof, and means, substantially as described, mounted on the spindles, for operating the clutches, of the pivoted cam-levers engaging and operating said clutch-operating means, and the intermittently-rotating camwheel having a straight cam-groove for the cam-levers, with as many equally-spaced turn-outs in such groove as there are sets of feed-spindles, whereby the feed-clutches of certain spindles may be simultaneously operated.

39. In a screw-making machine, the combination, with the cam-wheel and the cam-drum for operating the same, of a step-by-step actuated reciprocating slide for driving the cam-drum, and the reciprocating tool-holder carriage adjustably connected with said slide, whereby the slide may be reciprocated step by step through the continuous reciprocation of the carriage.

40. In a screw-making machine, the combination, with the rotary cam-drum and the slide engaging and operating the drum, of a reciprocating tool-holder carriage, a second slide connected with and responding to the movements of the carriage, and an automatic grip-and-release device between the two said slides, whereby a step-by-step motion may be imparted to the first said slide, for the purpose described.

41. In a screw-making machine, the combination, with the rotary cam-drum and a slide for rotating the same step by step, of a second slide connected adjustably to the reciprocating tool-holder carriage and responding to the movements thereof and engaging and pushing the said first slide in one direction of its reciprocation, a spring-actuated grip-and-release device mounted on the second said slide, a pair of adjustable coupling-studs mounted on said first slide and engaged by the said device, and the trip-pins for engaging and opening said grip device to release it from one of the coupling-pins, whereby as the carriage advances the continuous movement of the second slide may actuate the first slide step by step.

42. In a screw-making machine, the combination, with the rotary cam-drum and the step-by-step reciprocating slide operating the drum, of a second slide provided with an automatic grip-and-release device, substantially as described, for engaging the first slide, the reciprocating tool-holder carriage and a connecting-rod adjustably attached between the carriage and the second slide, a pair of adjustable stops mounted on said rod, and a push-piece projecting from the carriage and engaging said stops, substantially as and for the purpose described.

43. In a screw-making machine, the combination of a set of running rod-supplying spindles 22 22, mounted in a stationary stock and disposed equidistant in a circle and supplying the screw-rods to the machine, and the step-by-step rotating tool-holder 82, having the tools thereof arranged equidistant on a circle about the axis of rotation and concentric with the circle of the said spindles, said tool-holder adapted to reciprocate toward and away from the spindles in the direction of the length of the same, substantially as and for the purpose set forth.

44. In a screw-making machine, the combination of the step-by-step rotating tool-holder 82, adapted to reciprocate, the rotary disk 117, mounted in a stationary bearing and rotating step by step in unison with the tool-holder, the threading-die 113 110, mounted loosely through the tool-holder and disk and provided with the clutch 123 126 and the pinion 121, the shaft 41, and the clutch 116 119, mounted thereon and operated by the reciprocating movements of the tool-holder, the loose member of said latter clutch provided with the fast gear 120, meshing with and driving the pinion 121, substantially as and for the purpose set forth.

45. In a screw-making machine, the combination of the hollow mandrel 83, formed with the lateral slots 142, having the depressions 144 in the edges thereof, the spindle-shaft 41, extending through the center of the mandrel, and the clutch 116 119, mounted thereon and provided with the clutch-levers 136, pivoted to slide 89 on the shaft and engaging collar 137 and having the pivoted cam-toes 163, the clutch-plunger 138, sliding on shaft 41, the slide-bars 141, pivoted to the plunger and sliding in slots 142 of the mandrel and provided with the notches 143, the step-by-step actuated tool-holder 82, feathered on the mandrel so as to turn therewith and reciprocate thereon and provided with the spring-pawls 146, having hooked heads and provided with laterally-projecting lift-pins 150, substantially as and for the purpose set forth.

46. In a screw-making machine, the combination of the step-by-step rotating tool-holder 82 and the reciprocating carriage 62 therefor, the rotary disk 117, rotating step by step in unison with the tool-holder and mounted in a stationary bearing, the spring-actuated feed-clamp 157 156, mounted loosely through the tool-holder and disk and adapted to slide but not to rotate therein, the feed-fork 164, pivoted on disk 117 and engaging with one prong the notch 182 of the clamp-rod and engaging with the other prong the end of said rod, the slotted arbor having the spring-pressed feed-fork carrier 169 mounted thereon and engaging the stem of the fork and provided with the annular shoulder 171, the slide-bars 173, sliding in the slots of the arbor and provided with the projections 172 and the notches 174, and the spring-pawls 177, mounted on the carriage and engaging the slide-bars, substantially as and for the purpose set forth.

47. In a screw-making machine, the combination of the reciprocating carriage provided with the step-by-step rotating tool-holder 82, the mandrel 83, on which the holder reciprocates and with which it turns, the rotary disk 117, mounted in the stationary bearing 118 and supporting in part some of the tools of the tool-holder, and the hollow shaft 151, rigidly connecting the mandrel with the disk, so that the two may move together, substantially as and for the purpose set forth.

48. In a screw-making machine, the combination of the reciprocating carriage 62, having the step-by-step rotating tool-holder 82 mounted thereon, the threading-die mounted in the holder and having its rod formed with a notch 132, the spring-detent pivoted on the holder and engaging the die-rod, the pivoted trip-lever 133, for engaging the detent, the mandrel 83, over which the tool-holder reciprocates, and the cam 134, mounted on the mandrel and engaging the foot of the trip-lever, substantially as and for the purpose set forth.

49. In a screw-making machine, the combination of the reciprocating carriage 62, provided with the annular bearing 66, the cylindrical tool-holder 82, rotatively mounted in the carriage and provided with the radially-projecting push-pins 87, the stationary cam 88, disposed adjacent to the carriage and engaged by the push-pins for giving the partial revolutions to the holder, and the spring-trip device for compelling the push-pins to move onto the cam, substantially as and for the purpose set forth.

50. In a screw-making machine, the combination of the reciprocating carriage 62, provided with the annular bearing 66 and having the step-by-step rotating tool-holder 82 rotatively mounted in the bearing and formed with the series of bolt-holes 98, the locking device consisting in the spring-actuated bolt 96, working in the perforation 97, formed in the bearing 66, and provided with the lateral pins 103, the spring-actuated presser 100, formed with the inclined head 102, engaging the pins 103, the cam-track 107, formed with the depressions 108 and the elevations 109 and engaged by the presser 100, substantially as and for the purpose set forth.

51. In a screw-making machine, the combination of the reciprocating carriage 62, having the annular bearing 66, and the yoke-frame 67, provided with the guide-ribs, the cylindrical tool-holder 82, mounted in said bearing, and the semi-cylindrical bed-piece 70, provided with the guideways for the yoke and mounted on the machine-frame, substantially as and for the purpose set forth.

52. In a screw-making machine, the combination of the reciprocating carriage 62, the rocker-bar 72, hinged to the carriage at 74 on the axial line thereof and pivoted at 73, the cam-stud 75, fixed on the rocker-bar, the rotating cam-disk 77, provided with the heart-shaped cam-groove 76, into which the cam-stud 75 projects, and means for rotating the cam-disk, substantially as and for the purpose set forth.

53. In a screw-making machine, the combination of the set of running rod-supplying spindles 22, disposed equidistant and in a circle, the step-by-step rotating tool-turret 183, mounted concentrically with the circle of disposition of the feed-spindles and provided with a set of radially-reciprocating tool-slides, so as to bring the tools on such slides into lateral contact with the work in the rod-supplying spindles, substantially as and for the purpose set forth.

54. In a screw-making machine, the combination of the running rod-supplying spindles 22, disposed equidistant in a circle, the step-by-step rotating mandrel 83, having its center coincident with the center of the circle of the rod-supplying spindles, and the tool-turret 183, mounted on the mandrel and provided with a set of tool-slides 185, having means, substantially as described, for projecting and retracting them, so as to carry the tools laterally onto the work in the spindles, substantially as and for the purpose set forth.

55. In a screw-making machine, the combination of the set of rod-supplying spindles 22, arranged as described, the rotary mandrel 83, formed with the interior chamber 193 and the slots 206, the tool-turret 183, mounted on and turning with the mandrel and provided with a set of movable spring-actuated tool-slides 185, the spring-actuated slide-projecting tube 192, having the conical portion 195 and mounted within the chamber 193 of the mandrel and adapted to move endwise therein and engaging the inner ends of the tool-slides, the step-by-step rotating tool-holder 82, sliding over and turning with the mandrel and provided with the spring-pawls 202, for engaging and drawing out the projecting tube 192, substantially as and for the purpose set forth.

56. In a screw-making machine, the combination of the rotary mandrel 83, formed with the chamber 193, and the endwise-movable projecting tube 192, formed with the conical portion 195 and mounted within the mandrel and having means, substantially as described, for moving it, the tool-turret 183, provided with the set of slide-beds 184, and the spring-actuated tool-slides 185, mounted on such beds and having their inner ends provided with anti-friction rollers 191, engaging the conical portion of the projecting tube, substantially as and for the purpose set forth.

57. In a screw-making machine, the combination of the rotatively-mounted casing 23, having a beveled mouth and provided with a hub 31, having an inclined outer face, the clutch-tube 24, arranged within the casing and provided with the spring feed-clutch 25, the hub 28, fixed upon the end of the clutch-tube, the split spring-collar 29, provided with the wedging-lugs 30 and having an inclined face engaging the incline of hub 31, the said collar lying between the two said hubs 31 and 28, the wedging-sleeve 32, sliding on hub 28 and formed with notch 33, for engaging the wedging-lugs, and a lever for sliding said sleeve, substantially as and for the purpose set forth.

58. In a screw-making machine, the combination of the rod-supplying spindles 22, having the feed-clutches 25 and the mechanism, substantially as described, for operating said clutches, and the cam-levers 34, pivoted upon arms 36 and formed with forked ends for engaging the wedging-sleeves and having their other ends taking into the cam-groove 44 of the step-by-step rotating cam-wheel 45, such cam-groove formed with the turn-outs 50, for effecting the opening and closing of the feed-clutches, substantially as and for the purpose set forth.

59. In a screw-making machine, the combination of the pivoted cam-levers 34, the cam-wheel 45, formed with the cam-groove 44, having turn-outs 50 therein, the shaft 46 and the cam-drum 48 fixed thereon and provided with the peculiar camways 49, the step-by-step actuated slide 51, having its head taking into the camways 49 of the drum, so that the movements of the slide may be imparted to the drum, and the reciprocating tool-holder carriage adjustably connected with the slide 51, whereby the continuous reciprocation of the carriage may impart to the slide a step-by-step movement, substantially as and for the purpose set forth.

60. In a screw-making machine, the combination of the reciprocating slide 51, having a step-by-step movement in one way of its reciprocation, and the coupling-studs 58, adjustably mounted on said slide, a second reciprocating slide 54, provided with the grip-and-release device 55, for engaging the coupling-studs of slide 51, the trip-studs 56, for engaging said device, the reciprocating tool-holder carriage and the connecting-rod 63, adjustably attached to slide 54 and provided with the adjustable stops 68, and the push-piece 64 on the carriage for engaging the stops 68, substantially as and for the purpose set forth.

61. In a screw-making machine, the combination, with a step-by-step rotating tool-holder having the tools arranged equidistant in a circle therein, of the rod-supplying spindles 22, arranged in a similar circle and equidistant and each provided with a gear 39, and the spindle-driving shaft 41, provided with a gear 40, in mesh with said gears 39, for driving the spindles at uniform speeds, substantially as described.

62. In a screw-making machine, the combination of the rod-supplying spindles 22, arranged as described and provided each with a gear 39, the drive-shaft 41, provided with gear 40, for driving the gears 39, said shaft extending through the mandrel 83 and the disk 117, the tool-holder 82, mounted on the reciprocating carriage and rotating step by step on its axis, and the disk 117, moving in unison therewith, the threading-die 113 110, rotatively mounted in the tool-holder and the disk and provided with a locking device, the speed-multiplying gearing intermediate the shaft 41, and the die-rod 110, for effecting the unthreading motion, and the main clutch on the spindle-shaft operated by the reciprocation of the tool-holder, substantially as and for the purpose set forth.

63. In a screw-making machine, the combination of the rod-supplying spindles 22, arranged as described and provided with feed-clutches 25 and the operating means for the said clutches, the centrally-disposed spindle-driving shaft 41, geared to the spindles, the reciprocating carriage 62, having the step-by-step rotating tool-holder 82 mounted thereon and provided with the tool-sockets 111, the mandrel 83, having the shaft 41 extending therethrough and loosely extending through the tool-holder, which is adapted to slide over the mandrel and to impart its partial revolutions thereto, the tool-turret 183, mounted concentrically on the mandrel 83 and turning therewith, and provided with tool-slides adapted to be projected and retracted, and having the means, substantially as described, for projecting and retracting them, all substantially as and for the purpose set forth.

64. In a screw-making machine, the combination of the rod-supplying spindles, a reciprocating carriage having a tool-holder mounted thereon, and a feed-clamp loosely mounted in the tool-holder, so as to be capable of endwise movement therein, the reciprocations of said tool-holder operating to periodically thrust the feed-clamp onto the blank screw-rod in a spindle and to retract said clamp to effect the drawing out of the rod, for the purpose set forth.

65. In a screw-making machine, the combination of the running rod-supplying spindles, each provided with a feed-clutch for the screw-rods, a tool-holder having a reciprocating carriage for advancing the tools upon and withdrawing them from the screw-rods in the spindles, said feed-clutches connected to the reciprocating carriage and intermittently opened and closed by the reciprocations thereof, and an endwise-movable feed-clamp mounted in the tool-holder and adapted, by the reciprocations of the tool-holder, to be forced into engagement with a screw-rod and then withdrawn to effect the feeding of the engaged rod, the feed-clutch being open during such feeding, substantially as and for the purpose set forth.

In testimony whereof I have hereunto set my hand this 4th day of August, 1888, in the presence of the two subscribing witnesses.

GUSTAVUS LANDMANN.

Witnesses:
J. C. WASSERBACH,
EDW. H. ABBOT.